(12) United States Patent
Lee

(10) Patent No.: US 8,872,777 B2
(45) Date of Patent: Oct. 28, 2014

(54) COMPUTER KEYBOARD AND CONTROL METHOD THEREOF

(75) Inventor: Lin Lee, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 281 days.

(21) Appl. No.: 13/368,529

(22) Filed: Feb. 8, 2012

(65) Prior Publication Data

US 2013/0044060 A1    Feb. 21, 2013

(30) Foreign Application Priority Data

Aug. 17, 2011    (TW) .............................. 100129441 A

(51) Int. Cl.
G06F 3/041 (2006.01)
G06F 3/02 (2006.01)
G06F 3/0488 (2013.01)

(52) U.S. Cl.
CPC .......... *G06F 3/0221* (2013.01); *G06F 3/04886* (2013.01)
USPC ......................................................... 345/173

(58) Field of Classification Search
None
See application file for complete search history.

(56) References Cited

U.S. PATENT DOCUMENTS

| | | | |
|---|---|---|---|
| 5,681,220 A | 10/1997 | Bertram et al. | |
| 6,396,483 B1 | 5/2002 | Hiller | |
| 6,546,336 B1 * | 4/2003 | Matsuoka et al. | 701/472 |
| 6,724,370 B2 | 4/2004 | Dutta et al. | |
| 7,760,190 B2 * | 7/2010 | Yeh | 345/173 |
| 8,319,733 B1 * | 11/2012 | Lu et al. | 345/168 |
| 8,497,786 B2 * | 7/2013 | Camacho et al. | 341/33 |
| 8,564,541 B2 * | 10/2013 | Chou | 345/171 |
| 8,610,684 B2 * | 12/2013 | Kalu et al. | 345/173 |
| 2005/0190970 A1 * | 9/2005 | Griffin | 382/209 |
| 2008/0168290 A1 * | 7/2008 | Jobs et al. | 713/324 |
| 2009/0140988 A1 | 6/2009 | Thelemann et al. | |
| 2009/0219249 A1 * | 9/2009 | Hara | 345/168 |
| 2009/0278805 A1 | 11/2009 | Kao et al. | |
| 2010/0156803 A1 * | 6/2010 | Wu | 345/172 |
| 2010/0231523 A1 * | 9/2010 | Chou | 345/171 |
| 2010/0245323 A1 * | 9/2010 | Chia | 345/211 |
| 2011/0248838 A1 * | 10/2011 | Krahenbuhl et al. | 340/407.2 |
| 2013/0009989 A1 * | 1/2013 | Chen et al. | 345/629 |
| 2013/0314331 A1 * | 11/2013 | Rydenhag et al. | 345/173 |

OTHER PUBLICATIONS

Taiwanese language office action dated Jun. 11, 2014.
Partial translation of Taiwanese language office action.

* cited by examiner

*Primary Examiner* — Van Chow
(74) *Attorney, Agent, or Firm* — McClure, Qualey & Rodack, LLP

(57) ABSTRACT

A computer keyboard and a control method thereof are provided. The computer keyboard for using in an information processing system includes a housing, a number of physical keys, and a touchscreen. The housing has a first key area and a second key area. The physical keys are disposed within the first key area. The touchscreen is disposed within the second key area for displaying at least one virtual key.

11 Claims, 9 Drawing Sheets

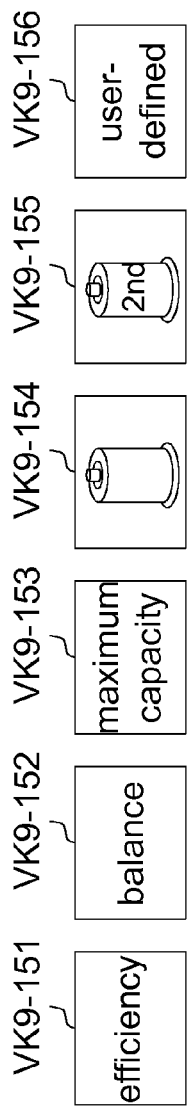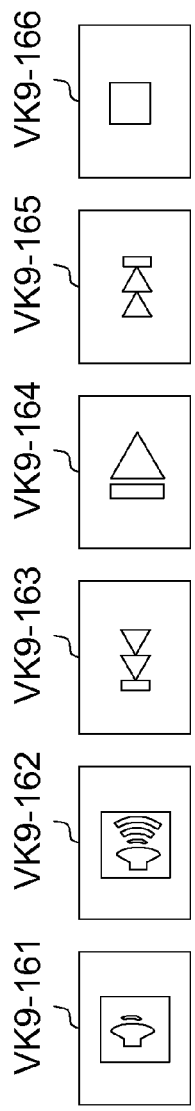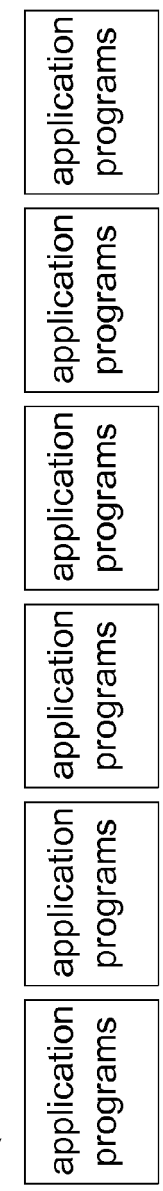

COMPUTER KEYBOARD AND CONTROL METHOD THEREOF

This application claims the benefit of Taiwan application Serial No. 100129441, filed Aug. 17, 2011, the subject matter of which is incorporated herein by reference.

BACKGROUND OF THE INVENTION

1. Field of the Invention

The invention relates in general to a computer keyboard and a control method thereof, and more particularly to a computer keyboard with touchscreen and a control method thereof.

2. Description of the Related Art

The keyboard refers to a set of keys for controlling a machine or a device through the arrangement of the system, and is mainly used for inputting data. The computer keyboard is one of the peripheral devices of a computer and can be used for inputting characters or controlling the operation of the computer.

Normally, the computer keyboard is composed of a set of buttons or keys. Each key has a symbol printed thereon. Under most circumstances, when a key is pressed, a corresponding symbol such as an alphabet, a numeric or a punctuation symbol will be produced. Such type of keys can be referred as "typing keys", and normally each typing key has a corresponding symbol printed thereon.

For some keys, their original functions will be modified when a combination of keys is used at the same time, and such keys are also referred as composite keys or modifier keys. For example, the Fn key with the symbol "Fn" printed thereon is a modifier key. When the Fn key and some other function keys such as the F4 function key are pressed at the same time, the original function of the F4 function key will be modified and another function will be generated. Since a key can have multiple functions, the number of keys is decreased and the size of keyboard is reduced.

However, the use of modifier keys is inconvenient. For example, the user needs to locate the key and may use both hands to press two or more than two keys at the same time. Such operation needs practice, and may cause inconvenience to inexperienced users. Furthermore, different providers have different designs of keyboard, and a user who has been used to a certain type of keyboard may find it troublesome to be adapted to a new keyboard with different design.

SUMMARY OF THE INVENTION

The invention is directed to a computer keyboard and a control method thereof which are capable of integrating peripheral function keys and composite function keys of the keyboard and providing more convenience in use.

According to one embodiment of the present invention, a computer keyboard for using in an information processing system is provided. The computer keyboard includes a housing, a number of physical keys, and a touchscreen. The housing has a first key area and the second key area. The physical keys are disposed within the first key area. The touchscreen is disposed within the second key area for displaying at least one virtual key.

According to an alternate embodiment of the present invention, a control method for using in the aforementioned computer keyboard is provided. The control method includes the following step. The touchscreen receives a keyboard actuation signal from the information processing system. The touchscreen displays a power management key for using in the information processing system according to the keyboard actuation signal. The touchscreen switches the power management key to a virtual key set according to the pressure applied on the power management key.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIGS. 9A to 9G respectively are schematic diagrams showing an example of a touchscreen of the computer keyboard of FIG. 1 and the content displayed thereon.

DETAILED DESCRIPTION OF THE INVENTION

A computer keyboard and a control method thereof are disclosed below in a number of embodiments. In some embodiments, the computer keyboard has a touchscreen for displaying a number of virtual keys. In other words, the virtual keys replace a part of the physical keys of a computer keyboard and at the same time provide the user with intuitive feeling in operating the virtual keys. Thus, the peripheral function keys are simplified, the composite function keys of the keyboard are integrated, and the operation of the keyboard is made more convenient.

Figure 1:
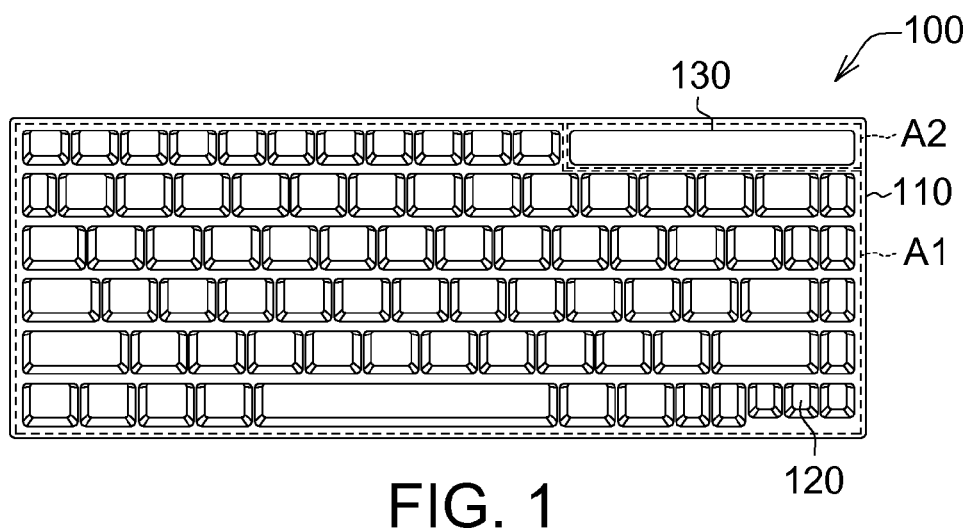
FIG. 1 is a schematic diagram showing an example of a computer keyboard according to an embodiment of the invention.

Referring to FIG. 1, a schematic diagram showing an example of a computer keyboard according to an embodiment of the invention is shown. The computer keyboard 100 includes a housing 110, a number of physical keys 120, and a touchscreen 130. The computer keyboard 100 is for using in an information processing system such as notebook computer, personal computer, notebook computer, server, or other device with processor and/or memory.

The housing 110 has a first key area A1 and a second key area A2. In some embodiments, exemplarily but not restrictively, the first key area A1 is such as larger than the second key area A2 so as to accommodate more keys. The first key area A1 and the second key area A2 are such as located on one surface of the housing 110 for the user to operate with his/her fingers. The two key areas A1 and A2 have a number of keys, and the varieties and locations of the keys as well as the layout of the computer keyboard 100 are designed according to user needs.

The physical keys 120 are disposed within the first key area A1. Corresponding symbols are printed on the physical keys 120 for identification purpose.

In some embodiments, the physical keys 120 include typing keys such as English alphabet keys, numbers keys, or symbol keys. Each typing key, when being pressed, produces a corresponding symbol.

In some embodiments, the physical keys 120 include a number of modifier keys such as the control (Ctrl) key, the shift key, the windows key, the alternate (Alt) key, the command key, or the function (Fn) key for modifying the original function of the keys.

In some embodiments, the physical keys 120 include a number of function keys such as F1, F2, . . . , and F12. The definitions of the function keys can be different in different software or applications.

In some embodiments, the physical keys 120 include a number of lock keys such as the scroll lock (Scr Lk) key, the number lock (Num Lk) key, the capital lock (Caps lock) key, or the function lock (F-Lock) key for locking/unlocking the functions of some keys.

In some embodiments, the physical keys 120 include a number of navigation keys such as the arrow key, the page up (Pg Up) key, the page down (Pg Dn) key, the home key, or the end key for controlling the position of the curser.

In some embodiments, the physical keys 120 include editing keys such as the backspace key, the delete key, the linefeed (Return/Enter) key, the insert key, the tab key, or the space bar for typesetting or for editing the texts.

In some embodiments, the physical keys 120 include power management keys such as the power key, the sleep key, or the wake key for controlling the power consumption of a computer host by such as starting up or shutting down the computer or enabling the computer to enter/exit a power-saving sleep mode.

In some embodiments, the physical keys 120 include applications keys such as the print screen key, the system request key, the break/pause key, the escape (Esc) key, or the menu key.

In some embodiments, the physical keys 120 such as include at least one category of the aforementioned typing keys, the modifier keys, the function keys, the lock keys, the navigation keys, the editing keys, the power management keys, and the application keys. Also, the physical keys 120 can includes other keys which are not mentioned in the above elaboration but are familiar to anyone who is skilled in the technology of the invention.

In the above embodiments, the names and categories of the physical keys 120 disclosed above are for exemplification purpose only, not for limiting the scope of the invention. In practical application, the physical keys 120 can be named and categorized in different ways.

The touchscreen 130 is disposed within the second key area A2 for displaying at least one virtual key. The virtual keys can be viewed as software elements for the user to input information with. The virtual keys can replace a part of the physical keys 120 of the computer keyboard 100 and save space. Thus, the number of physical keys can be decreased and the size of the keyboard can further be reduced. In comparison to the conventional operation of composite keys, the one-to-one operation of the virtual keys (one key corresponds to one single function) provides the user with more intuitive feeling and convenience in operating the keys.

Thus, the peripheral function keys are simplified and the composite function keys of the keyboard are integrated. For example, the virtual keys can replace a part of the physical keys, and the physical modifier keys, the function keys, the lock keys, the navigation keys, the editing keys, or the power management keys designed by different manufacturers for using in the computer keyboard can be integrated together.

Figure 2:
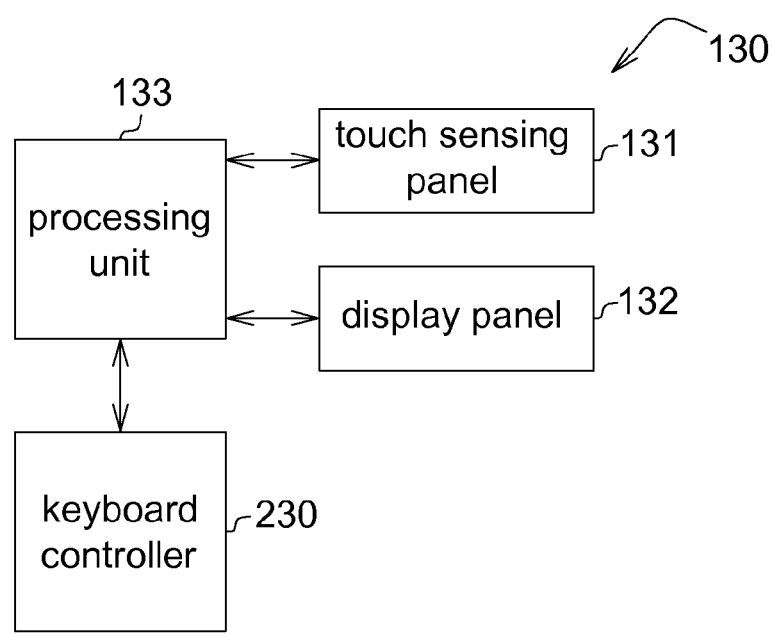
FIG. 2 is a schematic diagram showing an example of the touchscreen of the computer keyboard of FIG. 1.
Figure 3:
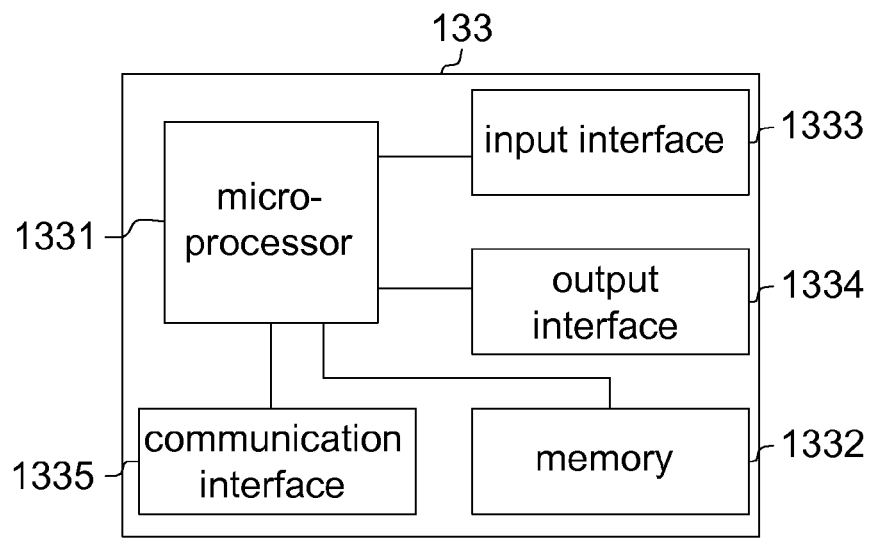
FIG. 3 is a schematic diagram showing an example of a processing unit of the touchscreen of FIG. 2.

Referring to FIG. 2 and FIG. 3. FIG. 2 is a schematic diagram showing an example of the touchscreen of the computer keyboard of FIG. 1. FIG. 3 is a schematic diagram showing an example of a processing unit of the touchscreen of FIG. 2. In the computer keyboard 100, the touchscreen 130 includes a touch sensing panel 131, a display panel 132, and a processing unit 133.

The touch sensing panel 131 is used for detecting the user's touch input. The touch sensing panel 131 can be realized by such as resistive touch sensing panel, capacitive touch sensing panel, or sound-wave touch sensing panel with different structures or sensing methods.

The display panel 132 is used for displaying various icons of the virtual keys. The display panel 132 can be realized by such as electrophoretic ink (E-Ink) display panel, light emitting diode (LED) liquid crystal display panel, organic light emitting diode (OLED) display panel, or active matrix organic light emitting diode (AMOLED) display panel. In some embodiments, the touch sensing panel 131 and display panel 132 can be integrated as a super AMOLED.

The processing unit 133 such as includes a micro-processor 1331, a memory 1332, an input interface 1333, an output interface 1334, and a communication interface 1335. After the touch signal of the touch sensing panel is inputted to the input interface 1333 and converted to a digital signal by the input interface 1333, the micro-processor 1331 searches the scan code vs. icon data table stored in the memory 1332 to locate the scan code and the icon data corresponding to the touch signal. Then, the icon data is outputted via the output interface 1334 of the micro-processor 1331, and the scan code is converted to a cabled or wireless signal by the communication interface 1335.

Figure 4:
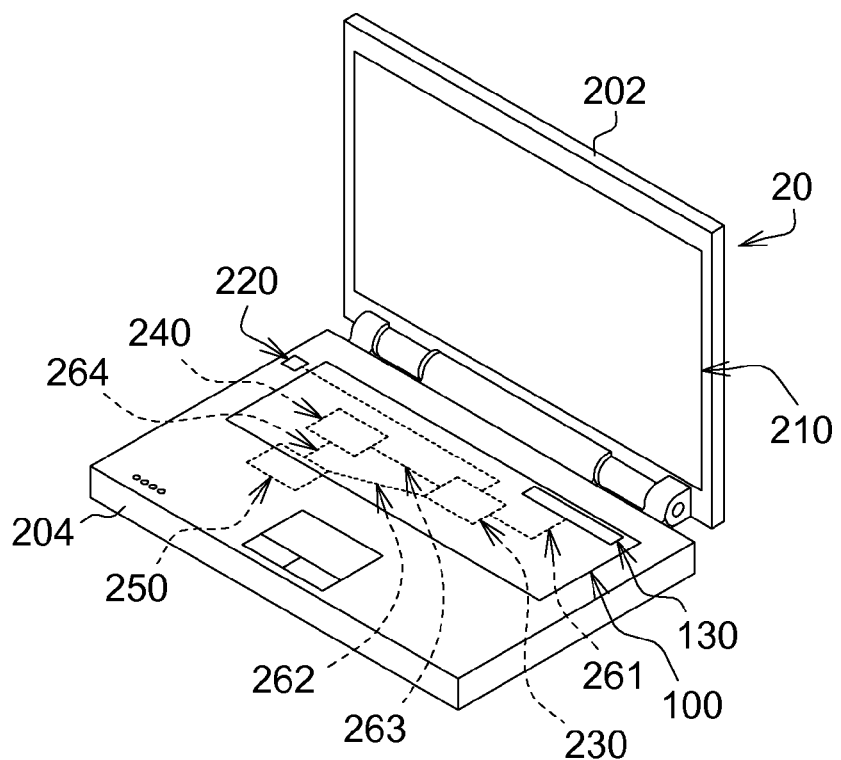
FIG. 4 is a schematic diagram showing an example of an information processing system for using in the computer keyboard of FIG. 1.

Referring to FIG. 2 and FIG. 4. FIG. 4 is a schematic diagram showing an example of an information processing system for using in the computer keyboard of FIG. 1. In the present example, a keyboard controller 230 is used as a bridge or a communication interface between the information processing system 20 and the computer keyboard 10. The keyboard controller 230 can be disposed in the computer keyboard 100 or the information processing system 20.

The scan code signal generated by the computer keyboard 100 is such as transmitted to the keyboard controller 230. For example, the scan code signal generated by the computer keyboard 100 is transmitted to the keyboard controller 230 via a USB 261 such as an inter-integrated circuit (I2C) USB or a PS2 USB.

After the scan code signal generated by the computer keyboard 100 is transmitted to the keyboard controller 230, the keyboard controller 230 informs the information processing system 20 to perform a corresponding operation.

For example, the keyboard controller 230 can decode the scan code signal and transmits the interrupted signal to the central processor 240 via the USB 262 such as a low pin count (LPC) USB, the platform controller hub (PCH) 250 and the direct media interface (DMI) 264 in order, so that the central processor 240 knows which key is pressed/released from the decoded data.

For example, if the computer keyboard 100 generates a scan code signal denoting starting up the system, then the keyboard controller 230 can turn on/off the power of the system 20 via the power control line 263.

Figure 5:
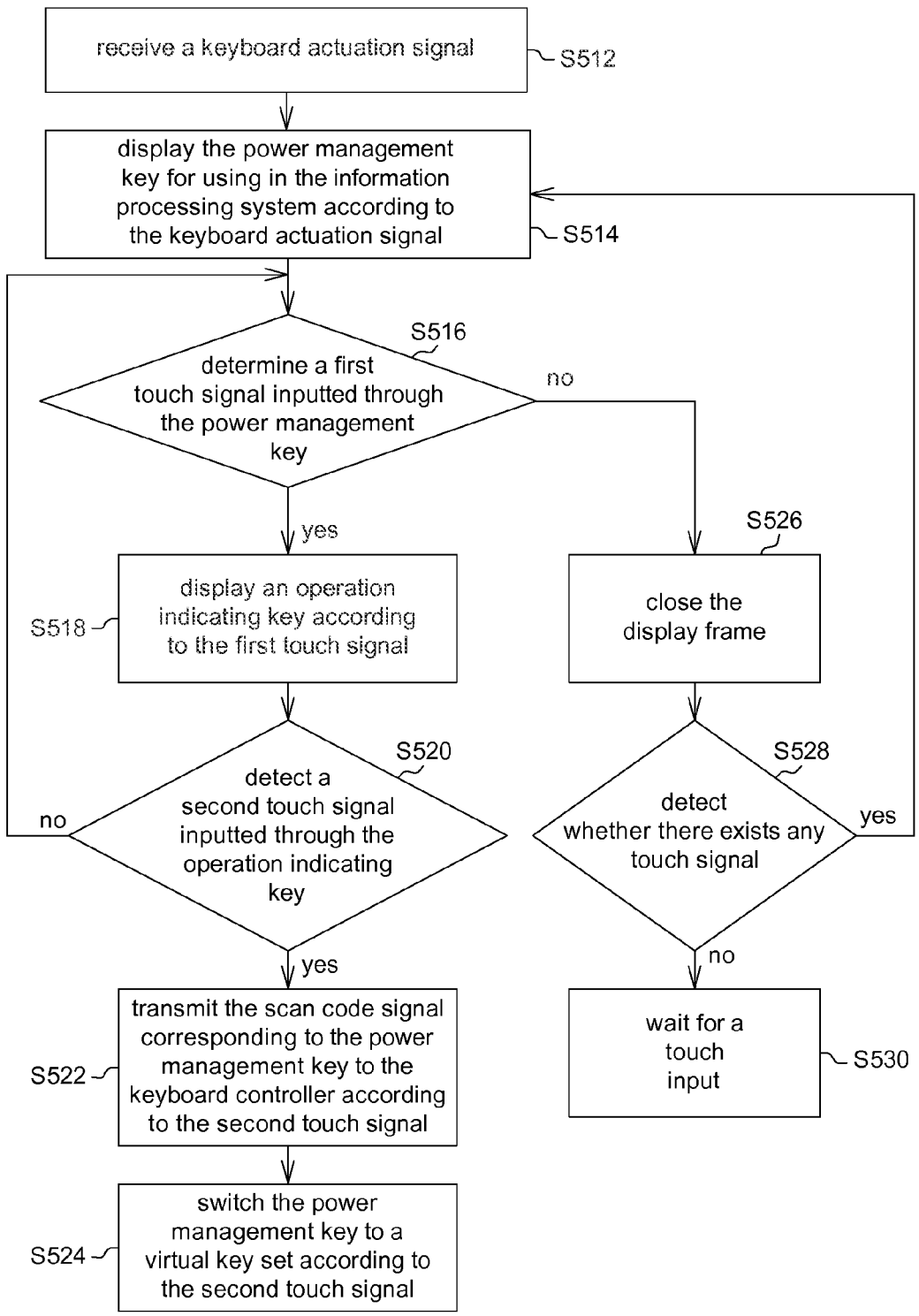
FIG. 5 is a flowchart showing an example of the control method for using in the computer keyboard of FIG. 1.

Referring to FIGS. 4, 5, and 6A to 6C. FIG. 5 is a flowchart showing an example of the control method for using in the computer keyboard of FIG. 1. FIGS. 6A to 6D respectively are schematic diagrams showing an example of a touchscreen of the computer keyboard of FIG. 1 and the content displayed thereon.

As indicated in step S512, the touchscreen 130 receives a keyboard actuation signal from the information processing system 20.

Illustrated in FIG. 4, the keyboard actuation signal received by the touchscreen 130 can be generated by the keyboard controller 230 when being triggered by the switch 220 of the information processing system 20. In the present example, the information processing system 20 can be viewed as a notebook computer having an upper cover 202 and a lower cover 204. The upper cover 202 refers to the part including the print screen key 210. The lower cover 204 refers to the part including the computer keyboard 100, the keyboard controller 230, the central processor 240, or the PCH 250. The circuit elements illustrated here are for exemplification purpose only, and the information processing system 20 can include other more complicated circuit elements not illustrated here.

The information processing system 20 triggers the switch 220 according to the OPEN/CLOSE states of the upper cover 202 and the lower cover 204. In other words, when the information processing system 20 detects that the upper cover 202 is opened and separated from the lower cover 204, the switch 220 is triggered and the keyboard controller 230 generates a keyboard actuation signal according to the triggering of the switch 220.

As indicated in step S514, the touchscreen 130 displays the power management key for using in the information processing system 20 according to the keyboard actuation signal.

For example, after receiving the keyboard actuation signal, the touchscreen 130 reads the internal memory to obtain the icon data. Since the current keyboard actuation signal indicates that the information processing system 20 may be in a standby state, the touchscreen 130 can obtain the icon data denoting starting up the information processing system 20 and display the icon data in the form of a virtual key. Illustrated in FIG. 6A, the touchscreen 130 displays the power management key VK6-1 exemplified by a start-up key.

As indicated in step S516, the touchscreen 130 determines a first touch signal inputted through the power management key.

Figure 6A:
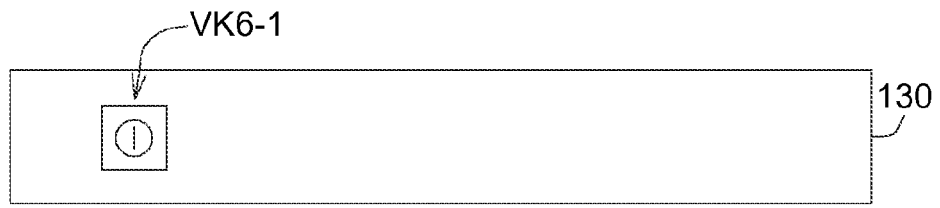
FIGS. 6A to 6D respectively are schematic diagrams showing an example of a touchscreen of the computer keyboard of FIG. 1 and the content displayed thereon.

For example, illustrated in FIG. 6A, the touchscreen 130 detects whether the touch input position is within or around the display range of the power management key VK6-1 and/or whether the duration of the touch time is longer than a default time. If so, the touchscreen 130 determines that the power management key VK6-1 is pressed and that a first touch signal is detected.

If the touchscreen 130 does not detect the first touch signal, then the method proceeds to step S526, the display frame of the touchscreen 130 is closed. Then, as indicated in step S528, the touchscreen 130 detects whether there exists any touch signal. If so, the method proceeds to step S514; otherwise, the method proceeds to step S530 to wait for the user to touch input.

Relatively, if the touchscreen 130 detects the first touch signal, then the method proceeds to step S518.

As indicated in step S518, the touchscreen 130 displays an operation indicating key according to the first touch signal.

Figure 6B:
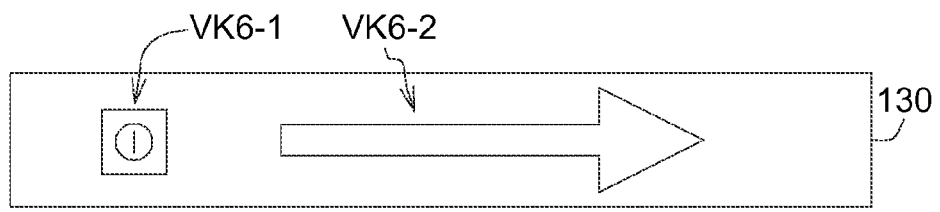

For example, illustrated in FIG. 6B, after determining that the power management key VK6-1 is pressed, the touchscreen 130 displays an operation indicating key VK6-2 for the user to operate with. In the present example, the operation indicating key VK6-2 is a slide operation key, which informs the user to slide from left to right on the panel with a finger or a stylus. The operation indicating key VK6-2 can be realized by a symbol (such as an arrow) and/or a text or in other forms.

As indicated in step S520, the touchscreen 130 detects a second touch signal inputted through the operation indicating key.

For example, illustrated in FIG. 6B, the touchscreen 130 detects whether the operation indicating key VK6-2 is pressed successfully. In the present example, after the user presses the left end of the key VK6-2 with his/her finger, if the user's finger keeps pressing the key VK6-2 and further slides to the right end of the key VK6-2, then the touchscreen 130 determines that the key VK6-2 is pressed successfully and that the second touch signal is detected.

If the touchscreen 130 does not detect the second touch signal, then the method proceeds to step S516; otherwise, the method proceeds to step S522.

As indicated in step S522, the touchscreen 130 transmits the scan code signal corresponding to the power management key to the keyboard controller 230 according to the second touch signal.

For example, if the touchscreen 130 determines that the operation indicating key VK6-2 is pressed successfully, then the scan code signal denoting starting up is transmitted to the keyboard controller 230. After receiving the scan code signal, the keyboard controller 230 immediately informs the system 20 to perform starting up.

Thus, the physical power keys of the computer keyboard 100 are replaced by virtual keys and the space is saved, not only decreasing the number of physical keys but also reducing the size of the keyboard.

As indicated in step S524, the touchscreen 130 switches the power management key to a virtual key set according to the second touch signal.

Figure 6C:
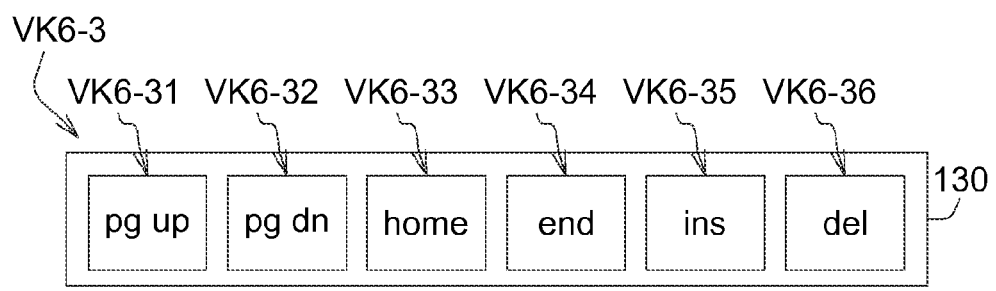

For example, illustrated in FIGS. 6B and 6C, after determining that the operation indicating key VK6-2 is pressed successfully, the touchscreen 130 switches the power management key VK6-1 to a virtual key set VK6-3 including six keys VK6-31 to VK6-36 with corresponding texts printed thereon respectively. In the present example, the touchscreen 130 is a long strip and the keys of the virtual key set VK6-3 are lined up in a row. The shape and size of the touchscreen as well as the variety, number and arrangement of the keys are for exemplification purpose, not for limiting the scope of protection of the invention.

The switching of virtual keys can replace a part of the physical keys of the computer keyboard 100 and reduce the occupied space, hence largely simplifying the number of physical keys and effectively reducing the size of the keyboard.

Figure 6D:
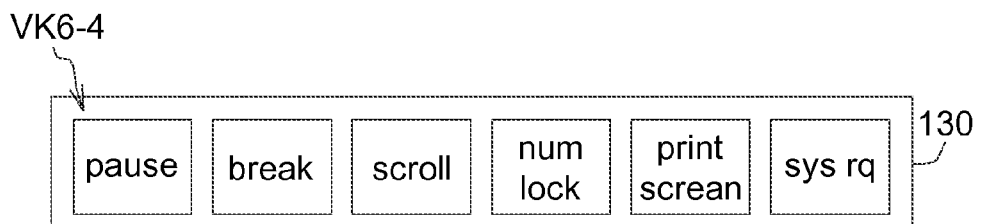
Figure 7:
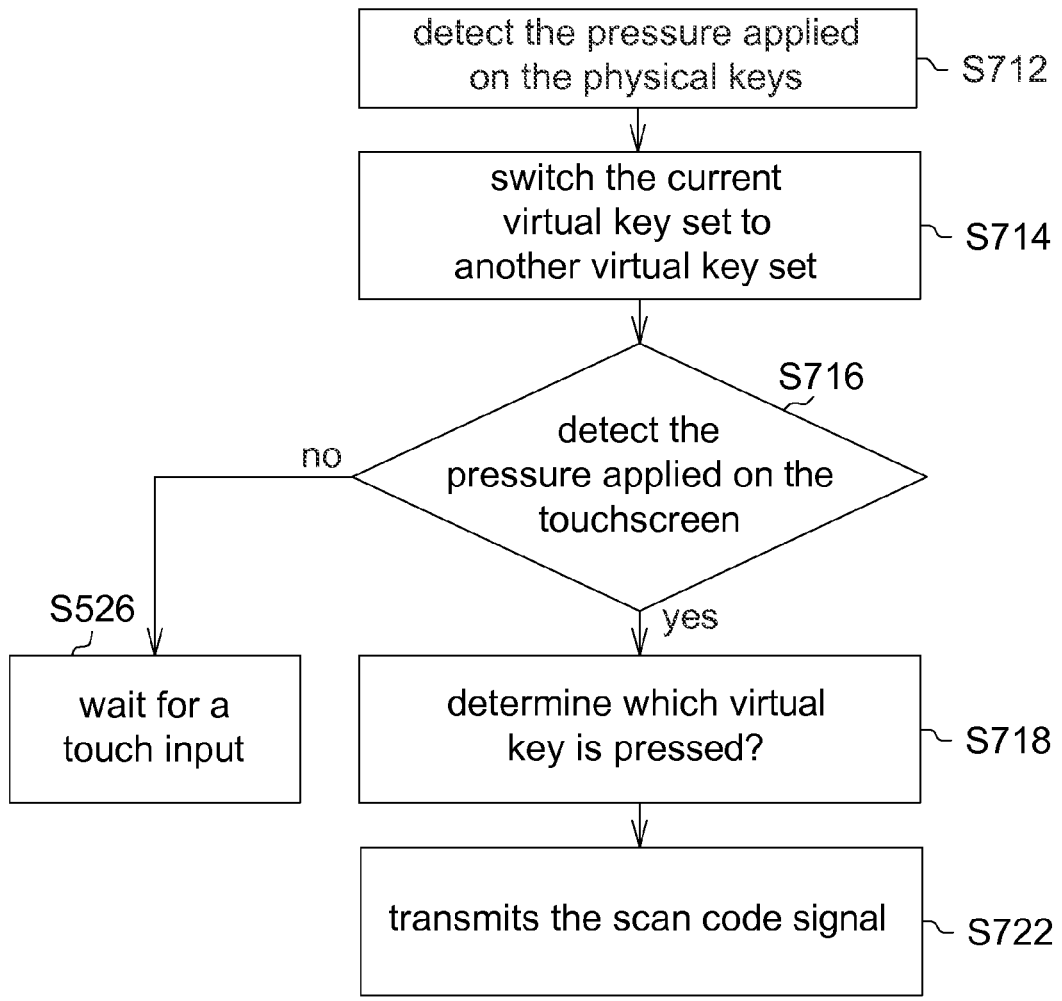
FIG. 7 is a flowchart showing an example of a control method for using in the computer keyboard of FIG. 1.

Referring to FIGS. 6C to 6D and 7. FIG. 6D is a schematic diagram showing an example of a touchscreen of the computer keyboard of FIG. 1 and the content displayed thereon. FIG. 7 is a flowchart showing an example of a control method for using in the computer keyboard of FIG. 1.

In some embodiments, the touchscreen 130 switches a virtual key set to another virtual key set according to the pressure applied on the physical keys 120.

For example, when one of the physical keys 120 is pressed, the touchscreen 130 switches a virtual key set VK6-3 illustrated in FIG. 6C to another virtual key set VK6-4 illustrated in FIG. 6D.

As indicated in step S712, the computer keyboard 100 detects the pressure applied on the physical keys 120. If one of the physical keys 120 such as the Fn key is pressed, then the method proceeds to step S714, the computer keyboard 100 controls the touchscreen 130 to switch the current virtual key set VK6-3 to another virtual key set such as the virtual key set VK6-4. As indicated in step S716, the computer keyboard 100 detects the pressure applied on the touchscreen 130. If the touchscreen 130 is not pressed, then the method proceeds to step S720 to wait for the user's touch input. If the touchscreen 130 is pressed, then the method proceeds to step S718, the computer keyboard 100 determines which virtual key is pressed. As indicated in step S722, the computer keyboard 100 transmits the corresponding scan code signal.

Thus, more varieties of virtual keys are provided for the user to choose, the number of physical keys is largely decreased and the size of the keyboard is effectively reduced.

Figure 8A:
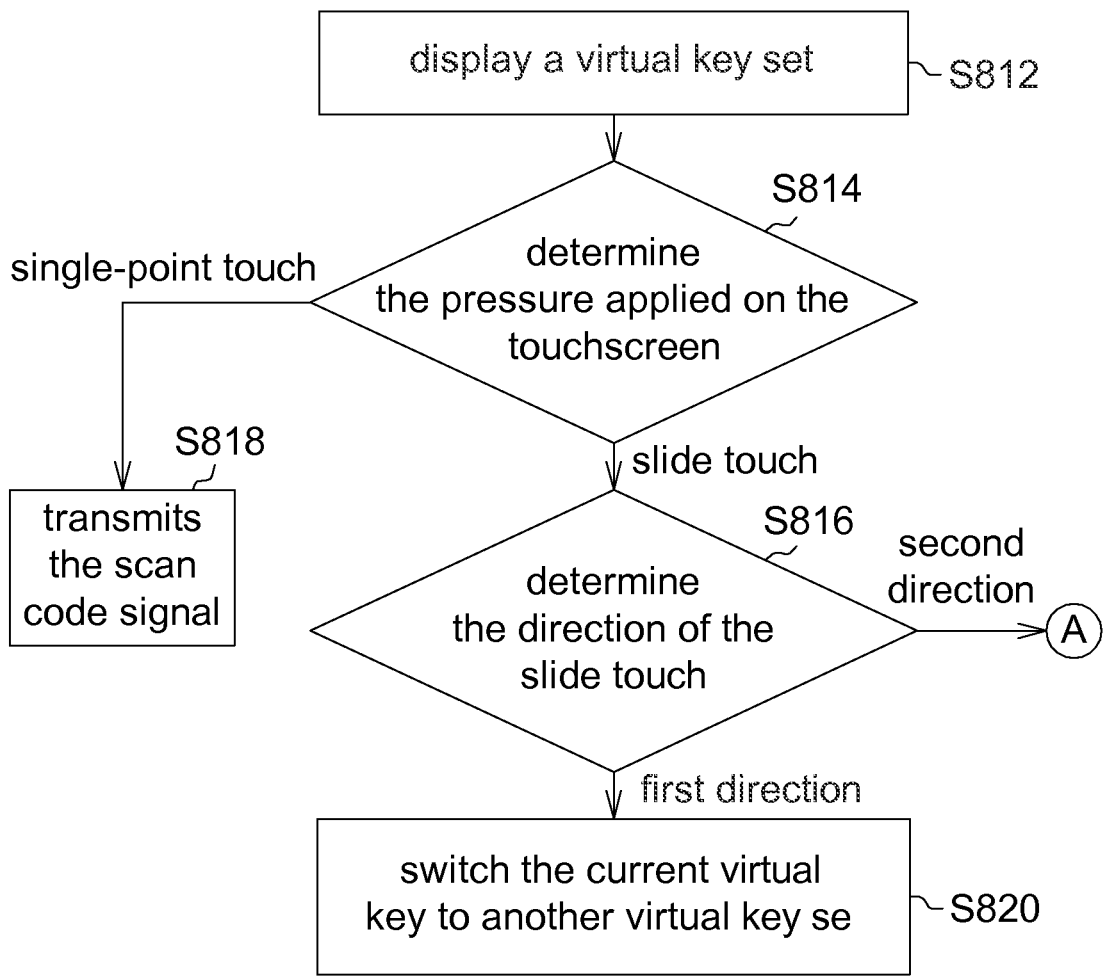
FIGS. 8A to 8B are flowcharts showing an example a control method for using in the computer keyboard of FIG. 1.
Figure 8B:
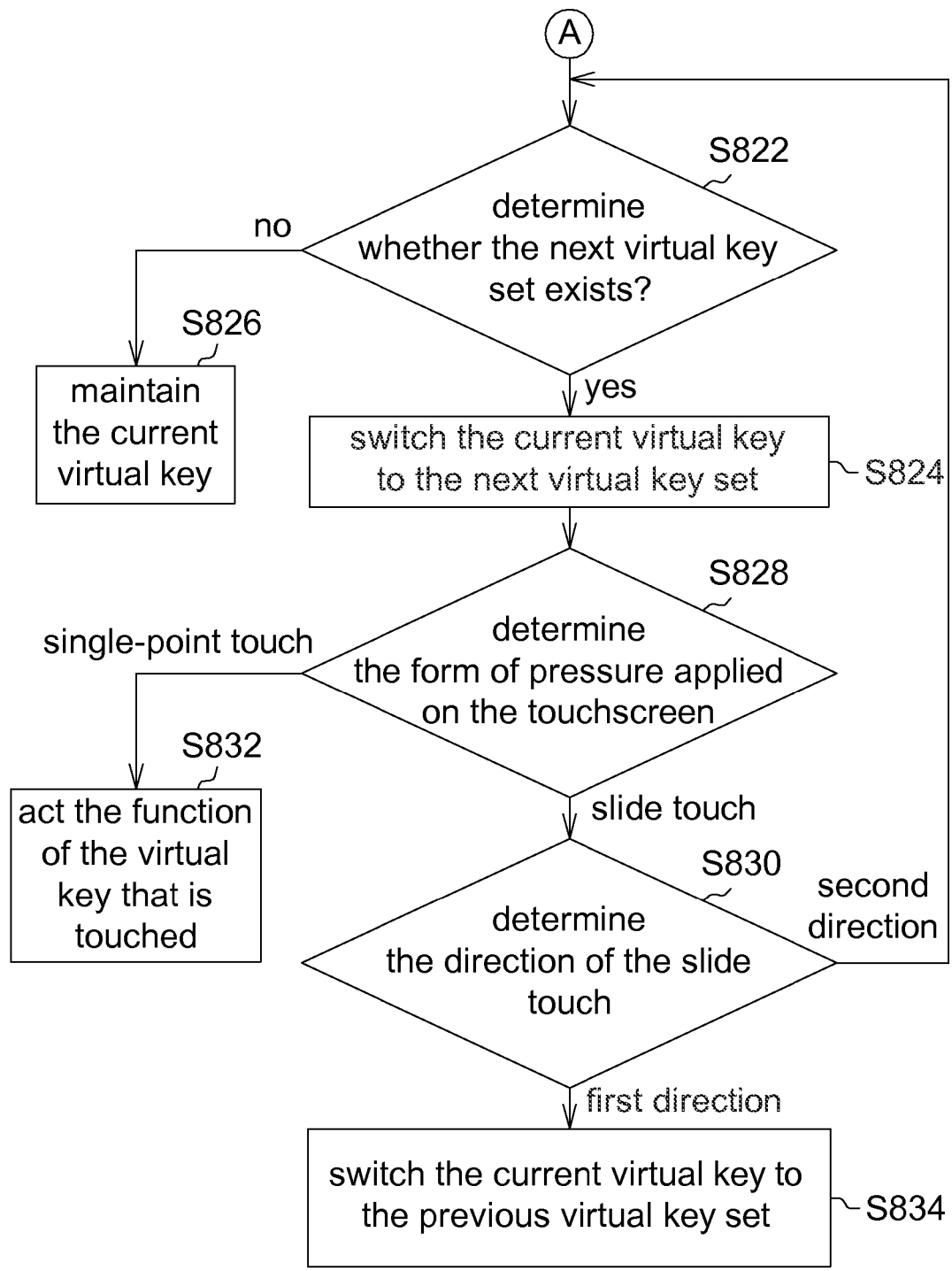

Referring to FIGS. 6C, 8A to 8B, and 9A to 9G. FIGS. 8A to 8B are flowcharts showing an example a control method for using in the computer keyboard of FIG. 1. FIGS. 9A to 9G respectively are schematic diagrams showing an example of a touchscreen of the computer keyboard of FIG. 1 and the content displayed thereon.

In some embodiments, the touchscreen 130 switches a virtual key set to another virtual key set according to the pressure applied on the virtual key set.

Figure 9A:
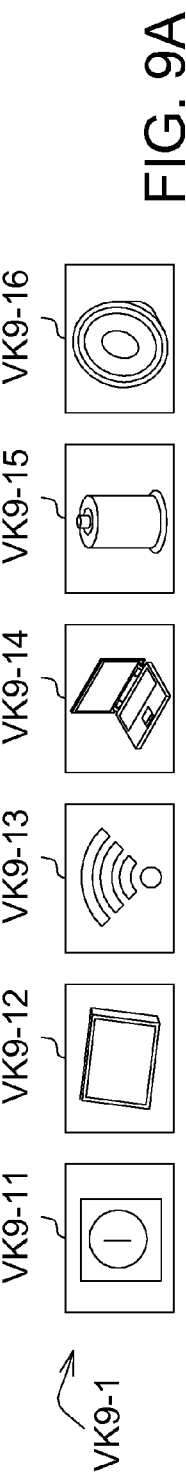
Figure 9B:
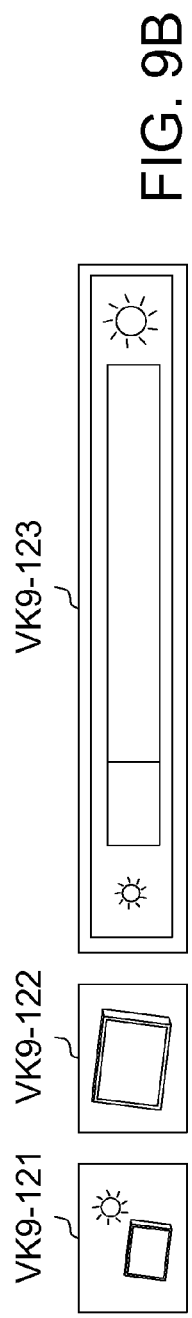
Figure 9C:
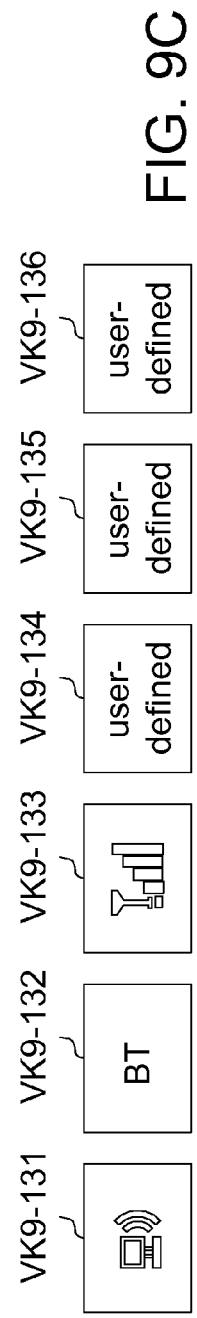
Figure 9D:
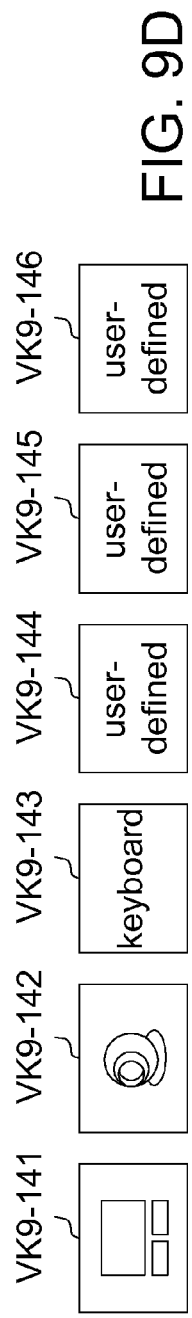

For example, when a virtual key set VK6-3 illustrated in FIG. 6C is pressed in a manner of slide touch, the touchscreen 130 switches the virtual key set VK6-3 to a virtual key set VK9-1 illustrated in FIG. 9A or a virtual key set VK9-2 illustrated in FIG. 9G.

As indicated in step S812, the computer keyboard 100 controls the touchscreen 130 to display a virtual key set such as the virtual key VK6-3 illustrated in FIG. 6C. As indicated in step S814, the computer keyboard 100 determines the form of pressure applied on the touchscreen 130. If it is determined that the pressure is a single-point touch, then the method proceeds to step S818, the computer keyboard 100 sends out a corresponding scan code signal. If it is determined that the pressure is a slide touch, then the method proceeds to step S816, the computer keyboard 100 determines the direction of the slide touch. If the direction is determined as the first direction (such as from right to left), then the method proceeds to step S820, the computer keyboard 100 controls the touchscreen 130 to switch the current virtual key VK6-3 to another virtual key set such as the virtual key VK9-2 illustrated in FIG. 9G. The virtual key VK9-2 can be realized the short-cut icons of various applications installed by the information processing system 20.

If the direction is determined as the second direction (such as from left to right), then the method proceeds to step S822, the computer keyboard 100 controls the touchscreen 130 to search the stored icon data to determine whether the next virtual key set exists. If the next virtual key set does not exist, then the method proceeds to step S826, the computer keyboard 100 controls the touchscreen 130 to maintain the current virtual key VK6-3. If the next virtual key set exists, then the method proceeds to step S824, the computer keyboard 100 controls the touchscreen 130 to switch the virtual key VK6-3 to the next virtual key set such as the virtual key VK9-1.

As indicated in step S828, the computer keyboard 100 determines the form of pressure applied on the touchscreen 130. If it is determined that the pressure is a slide touch, then the method proceeds to step S830. If it is determined that the pressure is a single-point touch, then the method proceeds to step S832.

In step S830, the computer keyboard 100 determines the direction of the slide touch. If the direction is determined as the first direction, then the method proceeds to step S834, the computer keyboard 100 controls the touchscreen 130 to switch the current virtual key VK9-2 to the previous virtual key set such as the virtual key VK6-3. If the direction is determined as the second direction, then the method proceeds to step S822.

In step S832, the computer keyboard 100 acts the function of the virtual key that is touched. Referring to FIG. 9A, the virtual key set VK9-1 includes a number of virtual keys VK9-11 to VK9-16. When the virtual key VK9-11 (such as the power key) is touched, this indicates that the scan code signal for shutting down the system will be generated and sent out. When the virtual key VK9-12 (such as the screen management key) is touched, then the keys VK9-121 to VK9-123 illustrated in FIG. 9B for opening/closing the screen and adjusting screen parameters (brightness, backlight, contrast, saturation and resolution) are displayed. If the virtual key VK9-13 (such as the wireless device management key) is touched, then the keys VK9-131 to VK9-133 illustrated in FIG. 9C for using in a network (such as the cabled/wireless network, a Bluetooth network, or a communication network) as well as the user-defined keys VK9-134 to VK9-136 are displayed. If the virtual key VK9-14 (such as the peripheral device management key) is touched, then the keys VK9-141 to VK9-143 illustrated in FIG. 9D for using in a peripheral device (such as a touch panel, a network camera, or a keyboard) as well as the user-defined keys VK9-144 to VK9-146 are displayed. If the virtual key VK9-15 (such as the battery management key) is touched, then the keys VK9-151 to VK9-155 illustrated in FIG. 9E and related to system power consumption (such as efficiency, balance, maximum capacity, current capacity, and backup capacity) as well as the user-defined key VK9-156 are displayed. If the virtual key VK9-16 (such as the multimedia management key) is touched, then the keys VK9-161 to VK9-166 illustrated in FIG. 9F for playing music are displayed.

According to the computer keyboard and the control method thereof disclosed in the above embodiments of the invention, the computer keyboard has a touchscreen for displaying virtual keys which can be used for replacing a part of the physical keys of the computer keyboard and providing the user with intuitive feeling in operation. Thus, the size of the keyboard is reduced and the convenience in use is increased.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer keyboard for using in an information processing system, wherein the computer keyboard comprises:
a housing having a first key area and a second key area;
a plurality of physical keys disposed within the first key area; and
a touchscreen disposed within the second key area for displaying a power management key;
wherein the touchscreen displays an operation indicating key according to a first touch signal inputted through the power management key, and switches the power management key to a first virtual key set according to a second touch signal inputted through the operation indicating key.

2. The computer keyboard according to claim 1, wherein the touchscreen is a long strip for displaying a row of virtual keys.

3. The computer keyboard according to claim 1, wherein the touchscreen further switches the first virtual key set to a second virtual key set according to the pressure applied on the first virtual key set.

4. The computer keyboard according to claim 1, wherein the touchscreen further switches the first virtual key set to a second virtual key set according to the pressure applied on the physical keys.

5. The computer keyboard according to claim 1, wherein the operation indicating key is a slide operation key.

6. The computer keyboard according to claim 1, further comprising:
    a keyboard controller used for generating a keyboard actuation signal, wherein the touchscreen displays the power management key according to the keyboard actuation signal.

7. The computer keyboard according to claim 6, wherein the keyboard controller generates the keyboard actuation signal when a switch of the information processing system is triggered.

8. The computer keyboard according to claim 7, wherein the information processing system is a notebook computer having an upper cover and a lower cover for triggering the switch according to the OPEN/CLOSE states of the upper cover and the lower cover.

9. A control method for using in the computer keyboard according to claim 1, wherein the control method comprises:
    receiving a keyboard actuation signal from the information processing system by the touchscreen;
    displaying a power management key for using in the information processing system by the touchscreen according to the keyboard actuation signal;
    switching the power management key to a first virtual key set by the touchscreen according to the pressure applied on the power management key, wherein the step of switching the power management key to the first virtual key set by the touchscreen according to the pressure applied on the power management key including:
    detecting a first touch signal inputted through the power management key by the touchscreen;
    displaying an operation indicating key by the touchscreen according to the first touch signal;
    detecting a second touch signal inputted through the operation indicating key by the touchscreen; and
    switching the power management key to the first virtual key set by the touchscreen according to the second touch signal.

10. The control method according to claim 9, further comprising:
    switching the first virtual key set to a second virtual key set by the touchscreen according to the pressure applied on the first virtual key set or the physical keys.

11. The control method according to claim 9, wherein the operation indicating key is a slide operation key.

\* \* \* \* \*